United States Patent
Sutherland

(10) Patent No.: US 7,020,779 B1
(45) Date of Patent: Mar. 28, 2006

(54) SECURE, DISTRIBUTED E-MAIL SYSTEM

(75) Inventor: Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 647 days.

(21) Appl. No.: 09/644,086

(22) Filed: Aug. 22, 2000

(51) Int. Cl.
*H04K 1/00* (2006.01)
*H04L 9/00* (2006.01)

(52) U.S. Cl. ............... 713/185; 380/277; 380/278; 380/279; 709/204; 709/206; 709/207

(58) Field of Classification Search ............... 713/193, 713/200–202, 185; 709/226, 229, 207, 204, 709/206; 380/277–279
See application file for complete search history.

(56) References Cited

U.S. PATENT DOCUMENTS

| | | | |
|---|---|---|---|
| 5,265,159 A | 11/1993 | Kung | |
| 5,410,602 A | 4/1995 | Finkelstein et al. | |
| 5,775,995 A | 7/1998 | Okamoto | |
| 5,786,817 A | 7/1998 | Sakano et al. | |
| 5,794,253 A | 8/1998 | Norin et al. | |
| 5,870,548 A | 2/1999 | Nielsen | |
| 5,903,723 A | 5/1999 | Beck et al. | |
| 5,958,005 A * | 9/1999 | Thorne et al. | 709/202 |
| 6,134,660 A | 10/2000 | Boneh et al. | |
| 6,215,887 B1 | 4/2001 | Matsumoto | |
| 6,324,650 B1 | 11/2001 | Ogilvie | |
| 6,442,600 B1 * | 8/2002 | Anderson | 709/217 |
| 6,584,564 B1 * | 6/2003 | Olkin et al. | 713/152 |
| 6,625,734 B1 * | 9/2003 | Marvit et al. | 713/201 |
| 6,721,784 B1 * | 4/2004 | Leonard et al. | 709/206 |

FOREIGN PATENT DOCUMENTS

| | | |
|---|---|---|
| JP | 11-340965 | 12/1999 |
| WO | WO 01/08346 A1 | 7/2000 |

OTHER PUBLICATIONS

Henry et al. Off-the-record Email System, 2001 IEEE.*
Boneh, Dan et al., "A Revocable Backup System"; 1996 *6th USENIX Security Symposium*, pp. 91-96.

* cited by examiner

*Primary Examiner*—Kim Vu
*Assistant Examiner*—Beemnet W Dada
(74) *Attorney, Agent, or Firm*—Townsend and Townsend and Crew, LLP

(57) ABSTRACT

An e-mail handling system, wherein e-mail messages are entered, transported and stored, comprises a central key repository, means for encrypting a message using a key associated with the message, means for adding the key to the central key repository; and means for deleting the key for a message when the message is to be made unrecallable.

11 Claims, 4 Drawing Sheets

US 7,020,779 B1

SECURE, DISTRIBUTED E-MAIL SYSTEM

BACKGROUND OF THE INVENTION

The present invention relates to the field of e-mail systems. More specifically, one embodiment of the present invention provides a facility for easily controlling e-mail communications.

E-mail is an increasingly popular form of communication. One reason for this is that a sender can simply type in a message and press a button to have the email message sent to the recipient. Typically, the recipient receives the message, reads it and deletes it. E-mail drafters often assume, given the ease at which e-mail can be created, sent and read, that e-mail is a disposable, "off-the-record" communication. However, as currently practiced, e-mail messages are "on-the-record" communication since copies of e-mail messages may remain in the computer system used to convey the e-mail messages, and form a possibly permanent record subject to later scrutiny. In contrast, nearly all telephone conversations and face to face conversations are off-the-record. With the conversation being off-the-record, the participants can speak freely and informally, without worrying about their statements later being taken as polished, well thought out statements that can be later questioned. This on-the-record nature of e-mail and the continued existence of a copy of a message permits its examination under subpoena and risks its accidental exposure to unauthorized persons, either of which might embarrass the writer. Even when the writer believes that the message has been deleted, various system copies might still exist which may cause the same problems.

From the above it is seen that an improved e-mail handling system is needed.

SUMMARY OF THE INVENTION

An e-mail handling system, wherein e-mail messages are entered, transported and stored, comprises a central key repository, means for encrypting a message using a key associated with the message, means for adding the key to the central.

A further understanding of the nature and advantages of the inventions herein may be realized by reference to the remaining portions of the specification and the attached drawings.

DESCRIPTION OF THE PREFERRED EMBODIMENTS

Figure 1:
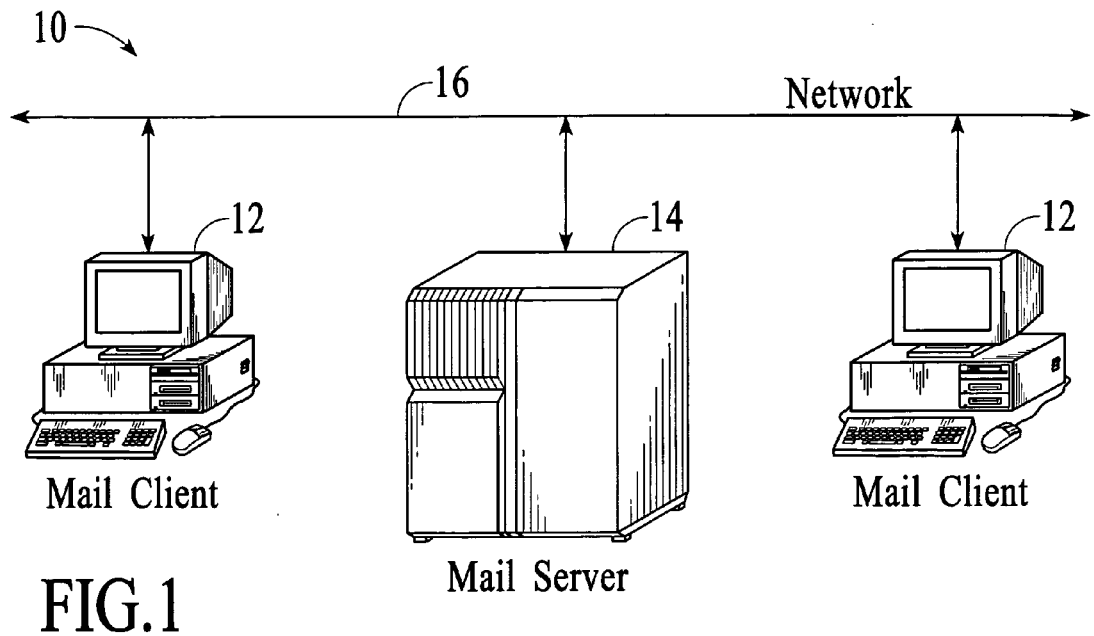
FIG. 1 illustrates a network over which the present invention could be used.

FIG. 1 is a block diagram of a computer system 10 in which the present invention might be used. Computer system 10 is shown including several client computers 12 coupled to a mail server 14 via a network 16. In this example, the network connecting the clients and server can be a local area network, a wide area network or the Internet, a global internetwork of networks in common use today to connect clients and servers.

Figure 2:
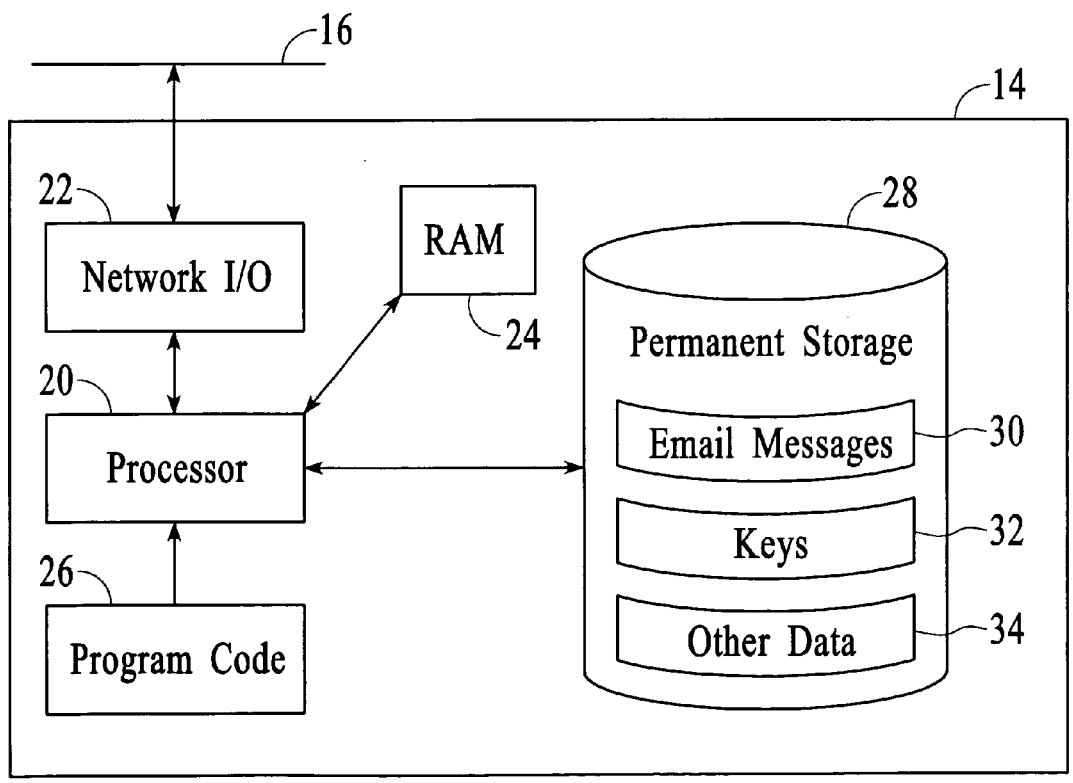
FIG. 2 is a block diagram showing the mail server of FIG. 1 in further detail.

FIG. 2 shows mail server 14 in further detail. A network interface 22 provides for communication between a processor 20 and network 16. Within mail server 14, processor 20 is coupled to a random access memory 24 and a program memory 26 containing program code that controls the operation of processor 20 (and thus mail server 14). Processor 20 is also coupled to storage 28, which serves as permanent storage for data. Storage 28 is "permanent" in that the data stored thereon persists even if mail server 14 is not powered up or operating. Although storage 28 is shown as being internal to mail server 14, it should be understood that the invention does not require internal storage and many other types of storage could be used instead, such as an external file server or hard drive.

Figure 3:
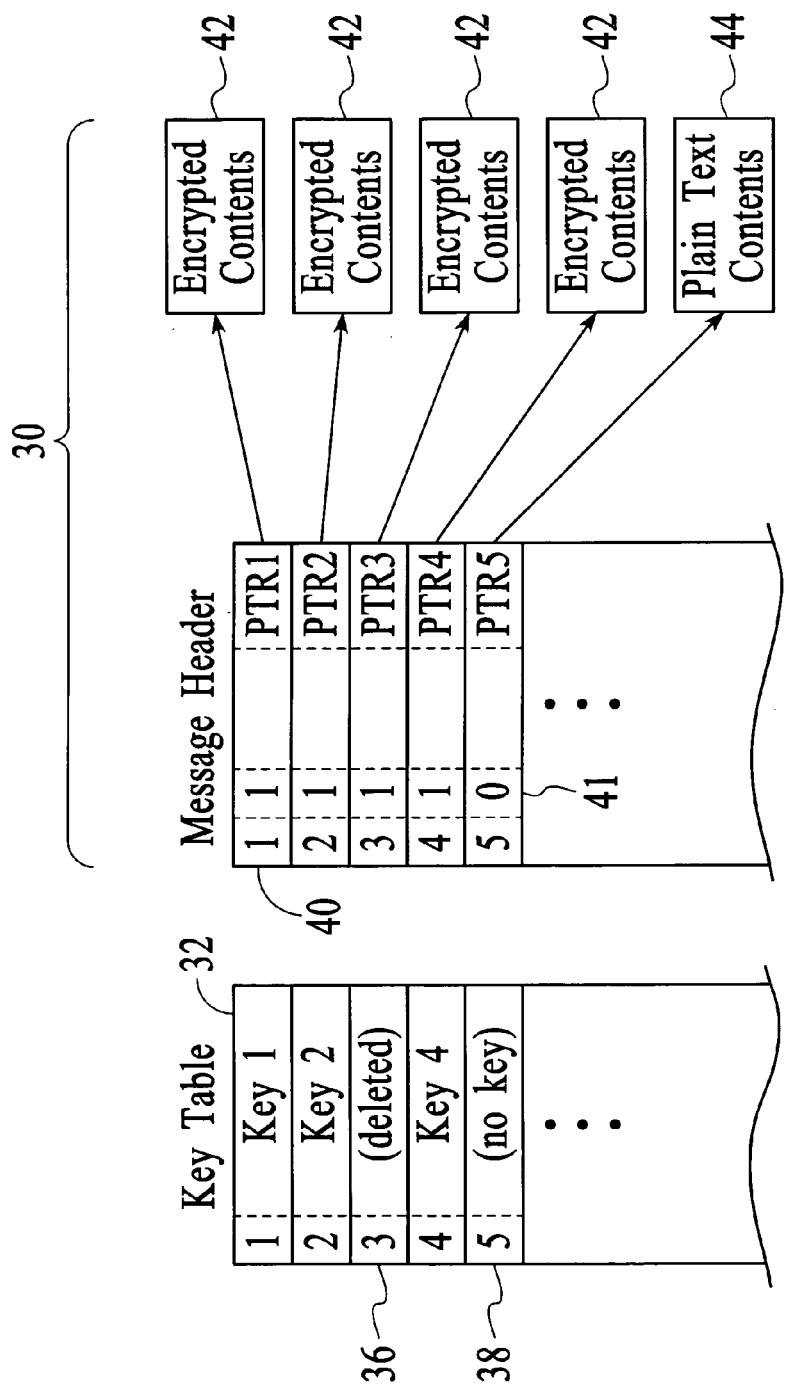
FIG. 3 is an illustration of the structures of a key table and a message table used as part of one embodiment of a mail system according to the present invention.

Storage 28 is shown with areas allocated to a message table 30, a key table 32 and other data 34. The structure of key table 32 and message table 30 is shown in greater detail in FIG. 3. In this example, key table 32 has multiple key entries and message table 30 has multiple message entries, with each table having fixed length entries with a correspondence between key table entries and message table entries. As shown, the message contents are stored separately, with pointers from the message table entries to message contents. This allows the message table entries to be fixed length without constraining the messages to be fixed length. Each entry in key table 32 holds a key value and is associated with a particular mail message ID. Some of the keys, such as the key for entry 36, might be deleted, as explained below. Some key table entries, such as entry 38, are designated "no key" to indicate that no key is needed to read the corresponding message.

Figure 4:
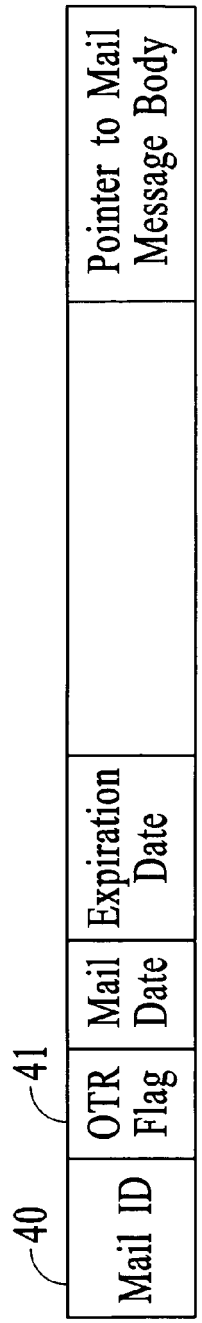
FIG. 4 is a schematic of one entry in the message table shown in FIG. 3.

FIG. 4 shows the structure of one example of a message table entry 40. That message table entry 40 includes fields for: a mail message ID, an OTR ("off-the-record") flag 41, a mail creation date, a mail expiration date and a pointer to the mail message contents. A message table entry might also include other fields not shown. The OTR flag 41 is used to indicate whether or not the message is an "off-the-record" message or a regular message. If the OTR flag is set (value="1"), the message is an "off-the-record" message subject to being "shredded" when the corresponding key is deleted from key table 32. In either case, a message might be stored on mail server 14, but if the OTR flag is set, the message contents is encrypted and the key is needed to decode the message. The message contents might be found in more than one location. For example, if each mail client stores a local copy of the message, each recipient would have a copy of the message and each backup made of the sender's computer, the mail server and the recipient clients could have a copy of the message. However, since the message is encrypted everywhere, the key is needed to read any copy of the message, and the key is not backed up with the message.

Figure 5A:
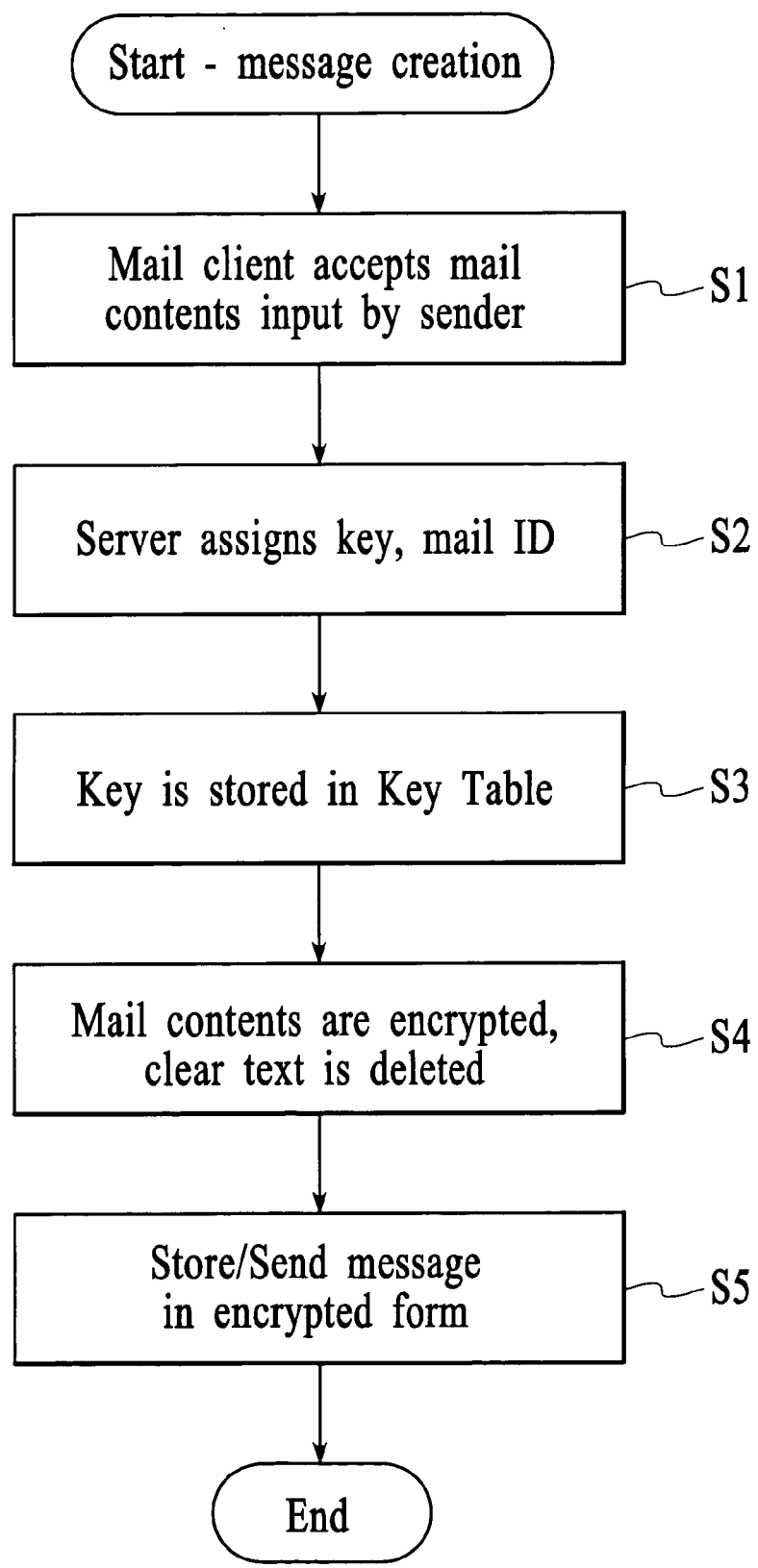
FIG. 5(a) is a flowchart of a process for creating a message in one embodiment of a mail system according to the present invention.

FIG. 5(a) illustrates a process of creating a message that is to be an off-the-record message. A mail client accepts input of the message (by a human user or a computer) and creates a data structure in the format desired by the mail client (step S1). The mail client then requests a mail ID and a key from the mail server (S2). The key is stored in the key table and a corresponding message entry is created in the message table (S3). The contents of the mail are encrypted and the clear text of the message is discarded (S4), and those steps can be done at the mail client or the mail server, taking into account the computing capabilities of each and the security available to prevent snooping of the clear text. Any suitable encryption could be used, such as triple-DES, to encrypt the messages. Once the message is encrypted, it can be sent (S5) and/or stored at the mail server.

Figure 5B:
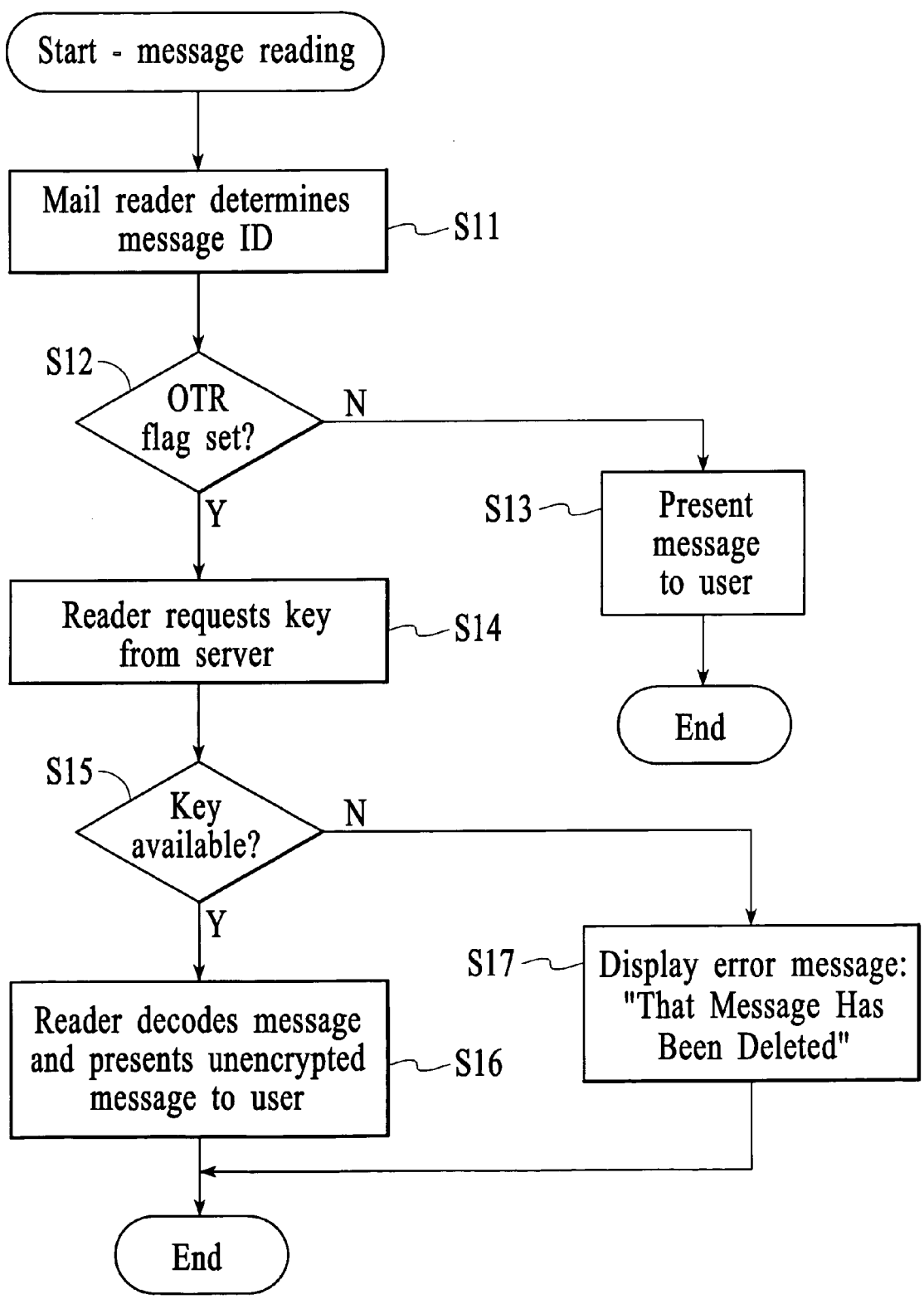
FIG. 5(b) is a flowchart of a process for reading a message in one embodiment of a mail system according to the present invention.

FIG. 5(b) illustrates a process of reading a mail message. Once a user makes a request to read a message, the mail reader determines the mail ID of the message to be displayed (S11). The mail reader then checks the message table to determine if the OTR flag is set (S12). If the OTR flag is not set, then the message is stored in unencrypted form and it is presented to the user (S13). That completes the reading process for non-OTR mail.

For OTR mail, the mail reader requests a key from the server for that ID (S14). The key server can be part of the mail server or a separate computer. If the key is not available (S15), the server reports the unavailability to the mail client, which displays an error (S17). If the key is available, the mail reader uses the key to decrypt the message and present it to the user (S16).

The key handling can be entirely transparent to the sender of a message and to the recipient or reader of the message. When a sender decides that a message is no longer needed, or when an expiration time is reached, the key for that message is deleted from the key table, rendering all the various copies of the message unreadable, wherever they happen to be stored. Because of this, senders can use e-mail messaging for off-the-record comments, knowing that each encrypted copy of the message would be, effectively, shredded wherever the message happens to be.

The key table can be used in a simple message purge process. In that purge process, the processor or program responsible for message storage examines the key table and each place an OTR message has a deleted key, the encrypted message associated with that deleted key is removed from the system. Preferably, the keys are not backed up with the messages. If the keys are backed up at all, preferably the backups are reviewed so that a key deleted from the mail server is also removed from the backups.

In a higher security environment, special controls can be placed on the machine that manages the key table to prevent compromise of the key table. However, not as much control need be placed on the machines that are maintaining copies of messages and making copies of messages, because those messages are encrypted.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An e-mail handling system, wherein e-mail messages are entered, transported and stored, the system comprising:
   a central key repository;
   means for encrypting a message using a key associated with the message;
   means for adding the key to the central key repository, wherein at least one key in the central key repository is an encryption key associated with a message designated as an off-the-record message and at least one key in the central key repository is a null key associated with a message designated as an on-the-record message such that the on-the-record message can be read without an encryption key;
   means for tagging the off-the-record message such that the off-the-record message and copies thereof are identified as being off-the-record; and
   means for deleting the key for a message when the message is to be made unrecallable, wherein the off-the-record message and copies thereof are rendered unreadable when the key associated with the off-the-record message is deleted,
   wherein at least one key in the central key repository is a deleted key associated with a message designated as an unreadable off-the-record message, thereby representing a previously available message that is presently unreadable, the e-mail handling system further comprising means for indicating the unavailability of the deleted message.

2. The e-mail handling system of claim 1, wherein the means for deleting the key comprises a means for deleting clear text from the off-the-record message to prevent snooping.

3. The e-mail handling system of claim 1, further comprising storage for fixed length message headers and variable length message contents, the fixed length message headers each comprising fields for a message identifier, an off-the-record flag and a pointer to corresponding message contents.

4. A method of selectively securing an e-mail system against recovery of selected messages after one or more of the selected messages are flagged as deleted messages even when stored representations of the selected message contents remain accessible, the method comprising the steps of:
   when a new message is created, determining whether the new message is to be created as a selected message or an unselected message;
   when a new message is created, generating a message key to be associated with the new message, the message key being a null message key if the new message is an unselected message;
   generating a transportable new message wherein the new message is encrypted using the new message's generated message key to form the transportable new message if the message is a selected message and wherein the transportable new message is an unencrypted form of the new message if the message is an unselected message;
   routing the transportable new message from a source to a plurality of destinations, at least one of which is not controllable for message deletion by an operator of the e-mail system;
   when the transportable new message is to be accessed at one or more of the plurality of destinations, retrieving a decoding key from a central key repository secured by the operator of the e-mail system, the decoding key corresponding to the message key generated for the transportable new message and being a null message key if the transportable new message is not an encrypted selected message; and
   when the transportable new message is to be deleted and is a selected message, deleting its associated message key from the central key repository,
   wherein at least one key in the central key repository is a deleted key associated with a message designated as an unreadable off-the-record message, thereby representing a previously available message that is presently unreadable, the e-mail system further comprising means for indicating the unavailability of the deleted message.

5. The method of claim 4, wherein accessing the transportable new message at the destination comprises reading a message header data structure having a fixed length and having at least a message identifier and a pointer to a variable length message content data structure.

6. The method of claim 4, further comprising purging the transportable new message and stored representations thereof from the e-mail system when the decoding key associated with the transportable new message is deleted.

7. A method of communicating with an off-the-record e-mail message, the method comprising:
   receiving, by a mail client, a e-mail message;
   generating a data structure for the e-mail message;
   requesting, by the mail client, a mail message identification and a key, wherein the key is stored in a key table;
   generating a copy of the e-mail message in a message table;
   if the e-mail message is off-the-record, labeling the e-mail message with a off-the-record indicator;
   if the e-mail message is off-the-record, encrypting the e-mail message and the copy thereof;
   if the e-mail message is off-the-record, discarding clear text associated with the e-mail message;
   transmitting the e-mail message to a destination e-mail reader;
   if the e-mail message is off-the-record, requesting, by the destination e-mail reader, the key associated with the e-mail message;
   decrypting, by the destination e-mail reader, the off-the-record message using its associated key; and
   purging the off-the-record message and the copy thereof when the associated off-the-record key is deleted;
   wherein at least one key in a central key repository is a deleted key associated with a message designated as an unreadable off-the-record message, thereby representing a previously available message that is presently unreadable, the method further comprising means for indicating the unavailability of a deleted message.

8. The method of claim 7, wherein labeling of the off-the-record e-mail messages with a indicator thereof comprises labeling with a off-the-record flag.

9. The method of claim 7, further comprising presenting e-mail messages not labeled as off-the-record to the e-mail reader in an unencrypted form.

10. The method of claim 7, further comprising deleting the key when its associated off-the-record e-mail message is deleted or a predetermined time period has expired.

11. The method of claim 7, further comprising generating a error message if the key is not obtainable by the destination c-mail reader.

* * * * *